US012315400B2

(12) United States Patent
Yasuda

(10) Patent No.: US 12,315,400 B2
(45) Date of Patent: May 27, 2025

(54) PROJECTOR

(71) Applicant: SEIKO EPSON CORPORATION, Tokyo (JP)

(72) Inventor: Masanori Yasuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/485,569

(22) Filed: Oct. 12, 2023

(65) Prior Publication Data

US 2024/0127727 A1 Apr. 18, 2024

(30) Foreign Application Priority Data

Oct. 13, 2022 (JP) ................................ 2022-164670

(51) Int. Cl.
*G09G 3/00* (2006.01)
*G09G 3/34* (2006.01)

(52) U.S. Cl.
CPC .......... *G09G 3/002* (2013.01); *G09G 3/3406* (2013.01); *G09G 2340/04* (2013.01)

(58) Field of Classification Search
CPC ............. G02B 26/0833; G02B 26/103; G02B 27/0093; G02B 27/0172; G02B 27/0179; G02B 2027/0147; G02B 2027/0178; G02B 2027/0187; G09F 9/00; G09G 3/025; G09G 5/00; G09G 2320/08; G09G 2340/0407; G09G 2354/00
See application file for complete search history.

(56) References Cited

U.S. PATENT DOCUMENTS 11,054,726 B2 * 7/2021 Miao .................... G03B 21/008
2017/0285450 A1 * 10/2017 Furihata ............. G03B 21/2053
2020/0045278 A1 * 2/2020 Tsukagoshi .......... H04N 9/3188
2020/0152105 A1 * 5/2020 Ishii ................... G02B 27/0172
2023/0213845 A1 * 7/2023 Yamamoto ........... G03B 21/147
353/69

FOREIGN PATENT DOCUMENTS

JP H09-138377 A 5/1997

* cited by examiner

*Primary Examiner* — Nelson M Rosario
(74) *Attorney, Agent, or Firm* — Dority & Manning, P.A.

(57) ABSTRACT

A projector includes an image generator that includes an image display apparatus having an image display region in which image light is displayed, a projection system that projects the image light output from the image display apparatus onto a projection receiving surface, a lens shift mechanism configured to shift the position of the projection system in a plane perpendicular to the optical axis of the projection system, and a controller that controls the image display apparatus when the lens shift mechanism moves the projection system to display the image light having been reduced in size in a reduced display region that is part of the image display region.

6 Claims, 4 Drawing Sheets

PROJECTOR

The present application is based on, and claims priority from JP Application Serial Number 2022-164670, filed Oct. 13, 2022, the disclosure of which is hereby incorporated by reference herein in its entirety.

BACKGROUND

1. Technical Field

The present disclosure relates to a projector.

2. Related Art

A projector described in JP-A-9-138377 below includes a lens shift mechanism that moves a projection system with respect to an image forming unit that includes a single liquid crystal panel.

JP-A-9-138377 is an example of the related art.

To use the lens shift mechanism described above, it is necessary to enlarge an image circle that is the effective optical range of the projection system. In general, enlarging the image circle increases the diameter of the projection system, and it is therefore difficult to reduce the size of the configuration of the projector while employing the lens shift function.

SUMMARY

To solve the problem described above, a projector according to an aspect of the present disclosure includes an image generator that includes an image display panel having an image display region in which image light is displayed, a projection system that projects the image light output from the image display panel onto a projection receiving surface, a lens shift mechanism configured to shift a position of the projection system in a plane perpendicular to an optical axis of the projection system, and a controller that controls the image display panel when the lens shift mechanism moves the projection system to display the image light that is reduced in size in a reduced display region that is part of the image display region.

DESCRIPTION OF EMBODIMENTS

Figure 1:
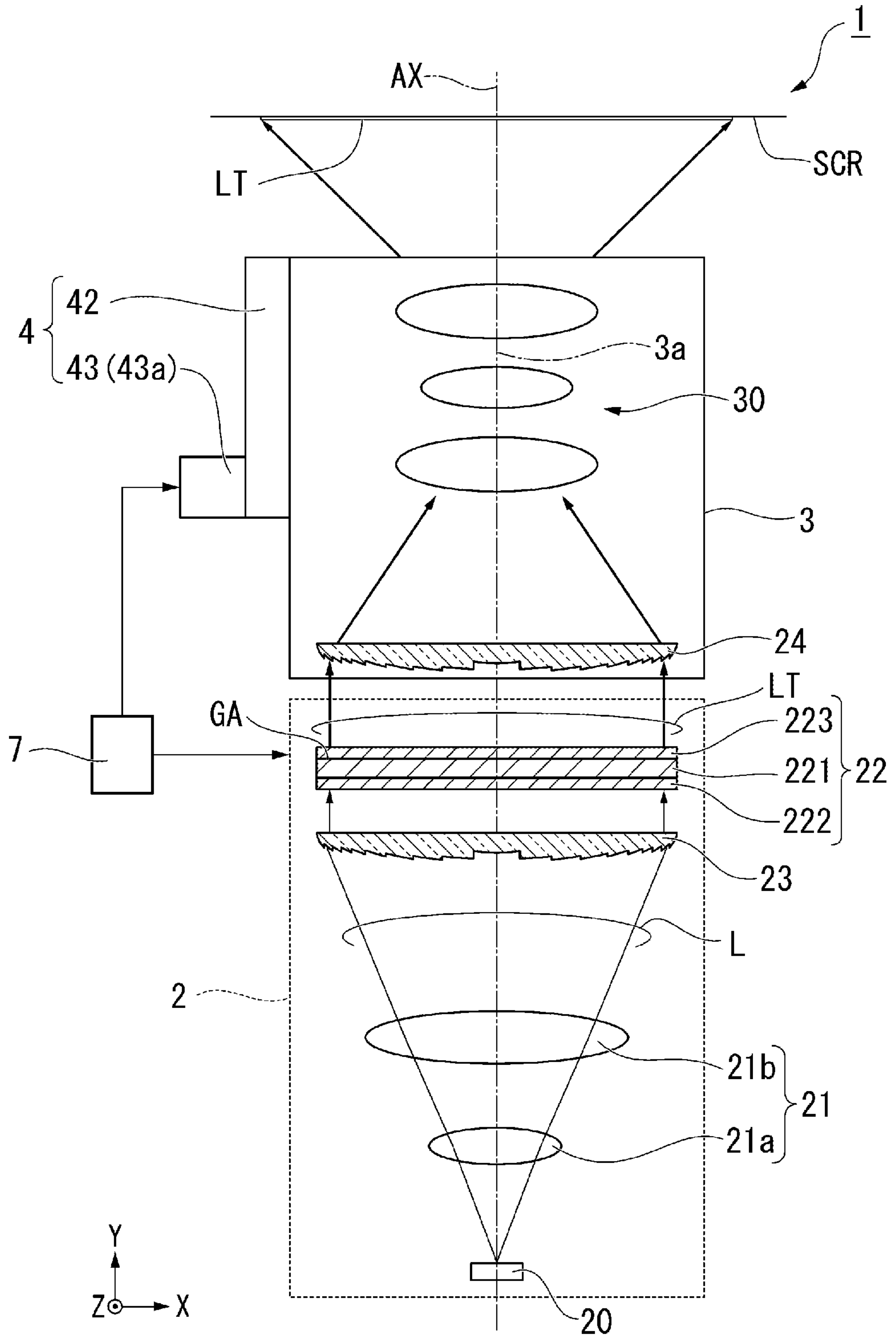
FIG. 1 shows a schematic configuration of a projector.

An embodiment of the present disclosure will be described below in detail with reference to the drawings. In the drawings used in the description below, a characteristic portion is enlarged for convenience in some cases for clarity of the characteristic thereof, and the dimension ratio and other factors of each component are therefore not always equal to actual values.

FIG. 1 shows a schematic configuration of a projector 1 according to the present embodiment.

The projector 1 according to the present embodiment is a projection-type image display apparatus that displays a color image on a screen SCR, which is a projection receiving surface, as shown in FIG. 1.

The projector 1 includes an image generator 2, a projection system 3, a lens shift mechanism 4, and a controller 7.

In the following description, an XYZ coordinate system shown in the drawings is used to describe in some cases the arrangement of the members described above. In the drawings, the axis Y is an axis extending along an optical axis AX, which is a reference axis along which optical parts of the projector 1 are arranged. The axis X is an axis perpendicular to the axis Y and extending along the horizontal width direction of image light LT projected onto the screen SCR. The axis Z is an axis perpendicular to the axes X and Y and extending along the upward-downward direction of the projector 1.

In the present embodiment, for example, the opposite directions along the axis Z are together referred to as an "upward-downward direction Z" in the projector 1, the direction toward the positive end of the direction Z is referred to as an "upper side", and the direction toward the negative end of the direction Z is referred to as a "lower side". The opposite directions along the axis X are together referred to as a "rightward-leftward direction X" in the projector 1, the direction toward the positive end of the direction X is referred to as a "right side", and the direction toward the negative end of the direction X is referred to as a "left side". The opposite directions along the axis Y are together referred to as a "frontward-rearward direction Y" in the projector 1, the direction toward the positive end of the direction Y is referred to as a "front side", and the direction toward the negative end of the direction Y is referred to as a "rear side".

The upward-downward direction Z, the rightward-leftward direction X, and the frontward-rearward direction Y are merely names for describing the arrangement of the constituent members of the projector 1, and do not specify the actual installation postures or orientations of the constituent members in the projector 1.

The image generator 2 has a light source 20, a light collection system 21, an image display apparatus 22, and a parallelizing system 23. The light source 20 outputs white light L. The light source 20 in the present embodiment is formed, for example, of a light emitting diode (LED). Using an LED as the light source 20 as described above allows reduction in the size and weight of the projector 1.

The light collection system 21 collects the white light L radially output from the light source 20. The light collection system 21 is formed, for example, of two convex lenses 21*a* and 21*b*. The number of lenses that constitute the light collection system 21 is not limited to a specific number, and may be one or three or more. The light collection system 21 is not necessarily formed of lenses, and may instead be a reflector or a rod-shaped lens.

The white light L collected by the light collection system 21 enters the parallelizing system 23.

The parallelizing system 23 is disposed between the light collection system 21 and the image display apparatus 22. The parallelizing system 23 parallelizes the white light L incident from the light collection system 21 and causes the parallelized white light L to enter the image display apparatus 22. In the present embodiment, the parallelizing system 23 is formed of a Fresnel lens and functions as a convex lens having positive power. The thickness of the parallelizing system 23 in the optical axis direction is therefore suppressed, so that the dimension of the projector 1 in the frontward-rearward direction Y along the optical axis AX is suppressed.

The image display apparatus 22 includes a liquid crystal panel 221 with a color filter, a light-incident-side polarizer 222, and a light-exiting-side polarizer 223. The projector 1 according to the present embodiment employs a single-panel scheme using one image display apparatus 22 to reduce the size of the configuration of the projector 1.

The liquid crystal panel 221 with a color filter has an image display region GA, which modulates the white light L from the light source 20 in accordance with image information and displays desired image light LT in full color. The light-incident-side polarizer 222 is provided at the light incident side of the liquid crystal panel 221. The light-exiting-side polarizer 223 is provided at the light exiting side of the liquid crystal panel 221. The light-incident-side polarizer 222 and the light-exiting-side polarizer 223 are so arranged that the polarization axes thereof are perpendicular to each other.

The projection system 3 includes a light collection system 24 and a projection lens group 30 formed of a plurality of lenses, enlarges the image light LT output from the image display apparatus 22, and projects the enlarged image light LT toward the screen SCR. An enlarged color image is thus displayed on the screen SCR.

The light collection system 24 is disposed at the light exiting side of the image display apparatus 22. Specifically, the light collection system 24 is disposed at the light exiting side of the light-exiting-side polarizer 223. The light collection system 24 collects the light output from the image display apparatus 22. In the present embodiment, the light collection system 24 is formed of a Fresnel lens and functions as a convex lens having positive power. The thickness of the light collection system 24 in the optical axis direction is therefore suppressed, so that the dimension of the projection system 3 in the frontward-rearward direction Y along an optical axis 3*a* thereof is suppressed.

In the projection system 3 in the present embodiment, the light collection system 24 collects the image light LT output from the image display apparatus 22, so that the diameters of the lenses of the projection lens group 30 disposed in the subsequent stage can be reduced. The size of the projection system 3 itself is thus reduced.

The lens shift mechanism 4 includes a lens shift member 42 and a lens driver 43. The lens shift member 42 is a member that holds the projection system 3 and is movably linked to an enclosure of the projector 1. The lens driver 43 includes a stepper motor 43*a* and gears, and generates driving force for moving the lens shift member 42. That is, the lens driver 43 generates driving force for moving the projection system 3. The lens shift mechanism 4 can further shift the optical axis of the light collection system 24 in such a way that the amount of shift coincides with the amount movement of the optical axis 3*a* of the projection lenses. As a method for shifting the optical axis of the light collection system 24, a motor or any other component can be used to shift the optical axis with respect to the enclosure of the projector 1, as the lens shift member 42 described above does.

The lens shift mechanism 4 can shift the position of the projection system 3 in a predetermined direction in a plane extending along the plane XZ, which is perpendicular to the optical axis 3*a* of the projection system 3, based on a signal transmitted from the controller 7. That is, the lens shift mechanism 4 can move the optical axis 3*a* of the projection system 3, for example, in the upward-downward direction Z, the rightward-leftward direction X, or an oblique direction that intersects with the upward-downward direction Z and the rightward-leftward direction X to adjust the position where the image is displayed on the screen SCR. The projector 1 according to the present embodiment, which is provided with the lens shift mechanism 4, can shift the image to a desired position and display the shifted image on the screen SCR.

Figure 2:
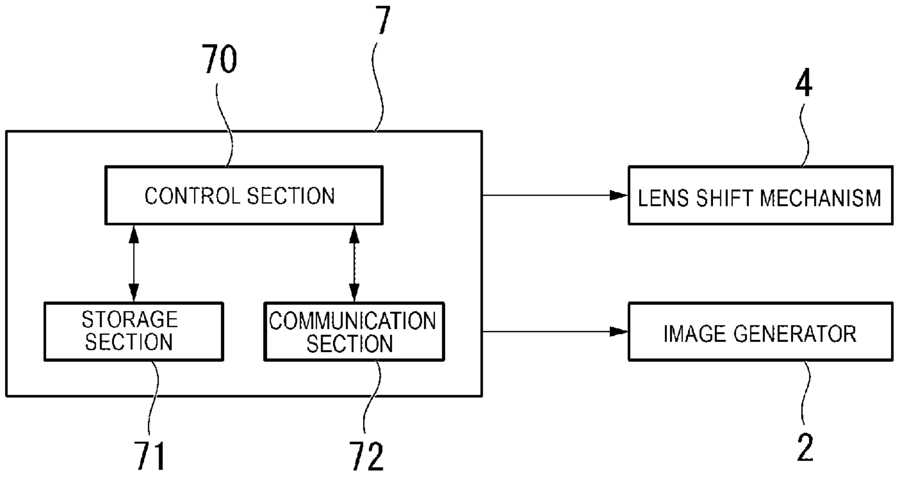
FIG. 2 shows an example of the configuration of a controller.

FIG. 2 shows an example of the configuration of the controller 7 in the present embodiment.

The controller 7 in the present embodiment includes a control section 70, a storage section 71, and a communication section 72, as shown in FIG. 2. The components described above are communicably connected to each other via a bus. The controller 7 also communicates with each of the image generator 2, the lens shift mechanism 4, and other apparatuses via the communication section 72. The projector 1 transmits an image signal transmitted from an external instrument to the image generator 2 via the communication section 72 of the controller 7.

The control section 70 is, for example, a CPU (central processing unit). Note that the control section 70 may be another processor, such as a digital signal processor (DSP) or a microcomputer, in place of the CPU. The control section 70 executes a variety of programs stored in the storage section 71. The control section 70 may be formed of a plurality of hardware components or a single processor. The control section 70 may still instead have a configuration in which a variety of programs programmed to achieve each function of the projector 1 are implemented as hardware circuits. In this case, the control section 70 is formed, for example, of an application specific integrated circuit (ASIC) and a field programmable gate array (FPGA).

The storage section 71 is, for example, a hard disk drive (HDD), a solid state drive (SSD), an electrically erasable programmable read-only memory (EEPROM), a read-only memory (ROM), and a random access memory (RAM). Note that the storage section 71 may be an external storage apparatus coupled, for example, via a digital input/output port, such as a USB port, in place of a storage apparatus built in the controller 7. The storage section 71 stores a variety of pieces of information, a variety of images, operation programs, and the like processed by the controller 7. Note that the storage section 71 may be formed of a single storage apparatus or a plurality of storage apparatuses. The plurality of storage apparatuses may include a storage apparatus provided in an information processing apparatus separate from the controller 7. In the present embodiment, the storage section 71 stores a control program executed by the control section 70, setting data including a variety of setting values regarding the action of the projector 1, and other pieces of information.

The communication section 72 includes, for example, a digital input/output port such as a USB port, an Ethernet (registered trademark) port, and other ports.

In the projector 1 according to the present embodiment, the controller 7 is electrically coupled to the image generator 2 and the lens shift mechanism 4 and controls the actions of the image generator 2 and the lens shift mechanism 4. The controller 7 controls the operation of driving the liquid crystal panel 221 in the image generator 2 and the operation of driving the stepper motor 43*a* of the lens driver 43 in the lens shift mechanism 4. The action of the controller 7 will be described later in detail.

In general, when a lens shift mechanism that shifts the position of a projection lens is employed, the range over which the projection lens is shifted is set based on the size of an image circle of the projection lens.

The image circle of a projection lens is a circular range within which the light having passed through the projection lens forms an image with a predetermined image quality condition is satisfied. That is, when the image light output from the liquid crystal panel passes through the image circle of the projection lens, the image light having passed through the projection lens forms an image on the screen.

Therefore, in the projector 1 according to the present embodiment, the lens shift range of the projection system 3 is so set that the image light LT output from the liquid crystal panel 221 passes through the image circle of the projection system 3. This is because the image light LT passing through the region outside the image circle of the projection system 3 cannot form an image on the screen SCR.

In general, the larger the size of the image circle, the larger the lens shift range of the projection system. Therefore, when employing a lens shift mechanism, it is preferable to use a projection system having a largest possible image circle. However, the larger the image circle, the larger the lens diameter of the projection system and hence the larger the projection system becomes, resulting in new problems, such as an increase in the weight and size of the projector.

In particular, the projector 1 according to the present embodiment employs a single-panel configuration, and therefore uses the liquid crystal panel 221 larger than those of a three-panel projector. In general, when a large liquid crystal panel is used, the image light occupies a large proportion of the image circle. Therefore, when combining a single-plate projector with a lens shift mechanism, it is necessary to increase the image circle of the projection lens, undesirably resulting in an increase in the size of the projection system and in turn an increase in the size of the projector.

On the other hand, in the projector 1 according to the present embodiment, the image light LT reduced in the size thereof is displayed at part of the image display region GA of the liquid crystal panel 221 of the image display apparatus 22 during the lens shift operation, as will be described later. In the present specification, part of the image display region GA, where the image light LT reduced in the size thereof is displayed, is referred to as a reduced display region, and the image light LT reduced in the size thereof and displayed in the reduced display region is referred to as reduced image light.

The reduced display region is a region that falls within the image circle of the image display region GA during the lens shift operation. Therefore, the reduced image light displayed in the reduced display region passes through the image circle of the projection system 3 and is satisfactorily displayed on the screen SCR.

The action of the projector 1 according to the present embodiment will subsequently be described. Specifically, how the controller 7 controls the image display apparatus 22 will be described.

The controller 7 detects the amount by which the lens shift mechanism 4 shifts the projection system 3.

The controller 7 is electrically coupled to the stepper motor 43*a* of the lens shift mechanism 4. The controller 7 can therefore acquire a pulse signal supplied to the stepper motor 43*a*, and detects the amount by which the lens shift mechanism 4 shifts the projection lens based on the acquired pulse signal.

Specifically, the controller 7 stores in the storage section 71 in advance information on the relationship between the pulse signal supplied to the stepper motor 43*a* and the position to which the projection system 3 is shifted by the stepper motor 43*a* and which corresponds to the pulse signal.

The controller 7 detects the amount by which the lens shift mechanism 4 has shifted the projection system 3 by comparing the detected pulse signal with the information on the relationship stored in the storage section 71 between the pulse signal and the amount of shift, and calculates the position of the image display region GA of the image display apparatus 22 with respect to the image circle of the projection system 3.

Figure 3:
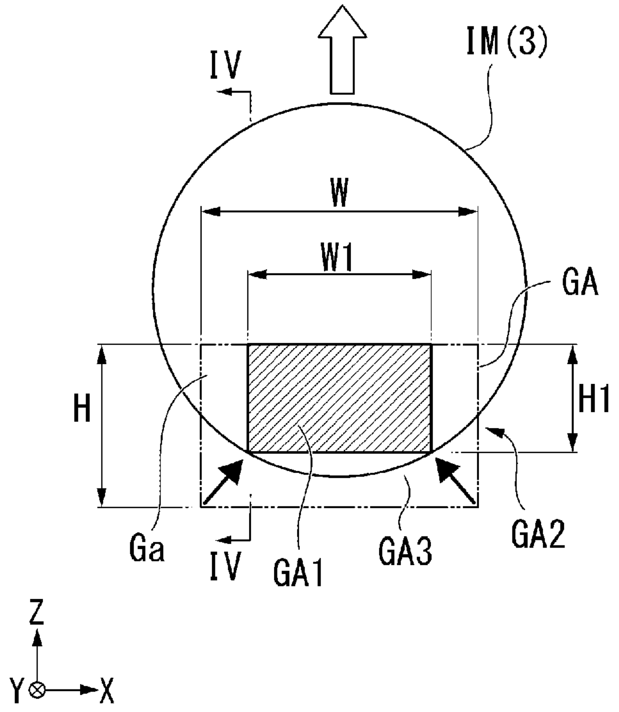
FIG. 3 shows the positional relationship between an image circle and an image display region during lens shift operation.

FIG. 3 is a conceptual diagram showing the positional relationship between an image circle IM and the image display region GA of the liquid crystal panel 221 achieved when the projection system 3 is shifted by the lens shift mechanism 4. FIG. 3 shows a state in which the projection system 3 is shifted upward in the upward-downward direction Z with respect to the image display apparatus 22 so that part of the image display region GA protrudes outside the image circle IM.

The controller 7 determines the position of the image display area GA with respect to the image circle IM from the positions of the intersections of the outer circumference of the image display region GA and the image circle IM and determines the area of a reduced display region GA1, in which reduced image light LT1 falling within the image circle IM is displayed, as shown in FIG. 3.

Since the controller 7 thus determines the area of the reduced display region GA1 based on the amount by which the projection system 3 is shifted, a situation in which the area of the reduced display region GA1 becomes excessively small can be avoided. That is, the area of the reduced display region GA1 can be set at an appropriate size.

Hereinafter, the region of the image display region GA that is located outside the reduced display region GA1 is referred to as an outer region GA2, and the region of the outer region GA2 that protrudes from the image circle IM is referred to as a protruding region GA3.

The controller 7 in the present embodiment controls the image display apparatus 22 when the lens shift mechanism 4 moves the projection system 3, and displays the reduced image light LT1, which is the image light LT having been reduced in size, in the reduced display region GA1, which is part of the image display region GA.

Figure 4:
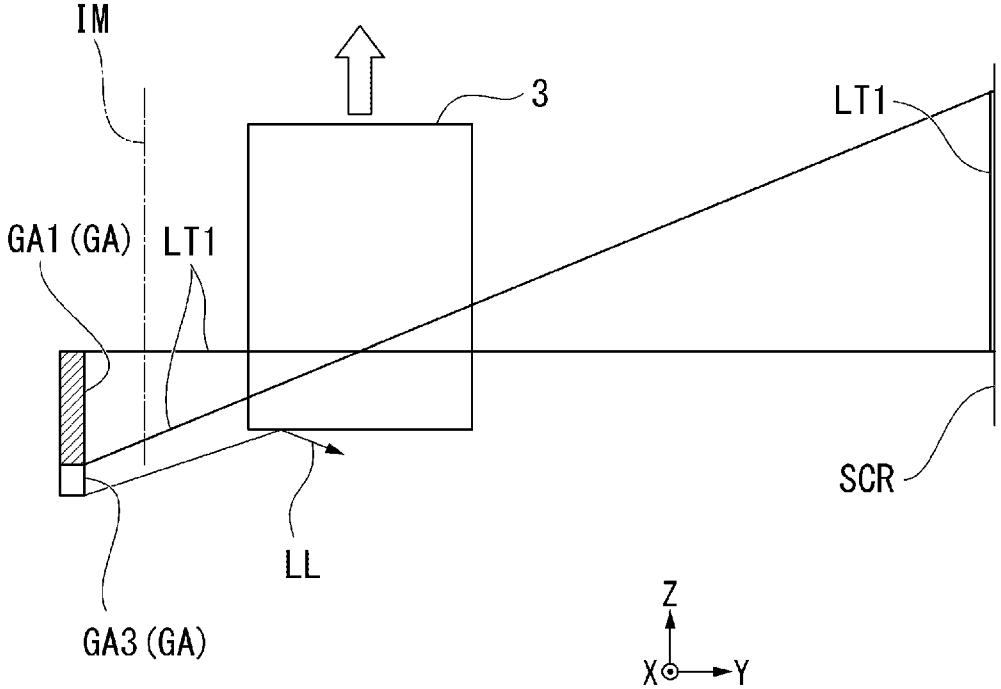
FIG. 4 shows the behavior of image light output from an image display apparatus during the lens shift operation.

FIG. 4 shows the behavior of the image light LT output from the image display apparatus 22 after the projection system 3 is shifted. FIG. 4 corresponds to the cross section taken along the line IV-IV in FIG. 3. In FIG. 4, the image circle IM of the projection system 3 is shown at an arbitrary position between the image display region GA of the image display apparatus 22 and the light incident surface of the projection system 3 for simplification of the description.

The reduced image light LT1 that exits via the reduced display region GA1, which falls within the image circle IM of the projection system 3, satisfactorily forms an image on the screen SCR via the projection system 3, as shown in FIG. 4. On the other hand, the image light LT that exits via the protruding region GA3 of the image display region GA, which protrudes outside the image circle IM of the projection system 3, does not properly exit via the projection system 3, and is therefore diffusively reflected inside the projector, so that the light enters as stray light the projection system 3. Such stray light may reduce as a ghost component the visibility of the image projected on the screen SCR. Furthermore, there is a possibility of heat generation at the lens barrel due to the diffusively reflected light absorbed by the lens barrel, or heat generation at the optical parts in the projector due to the diffusively reflected light incident thereon.

The image light that exits via a peripheral component Ga of the reduced display region GA1 shown in FIG. 3, which is the component outside the rectangular reduced display region GA1 but is located within the image circle IM, can be projected onto the screen via the projection system 3.

When the image light that exits via the peripheral component Ga of the reduced display region GA1 is projected onto the screen SCR, the outer shape of the image light projected onto the screen SCR is similar to the outer shape of the image display region GA located within the image circle IM, that is, a non-rectangular shape. The rectangular image projected on the screen SCR before the lens shift operation thus changes to a non-rectangular image, so that a user who views the screen SCR before and after the lens shift operation feels uncomfortable due to the change in the outer shape of the image.

In contrast, in the projector 1 according to the present embodiment, the controller 7 controls the image display apparatus 22 not to display the region other than the reduced display region GA1 in the image display region GA. Specifically, the controller 7 controls the image display apparatus 22 not to display the region outside the image circle IM, that is, the outer region GA2 of the reduced display region GA1 out of the image display region GA. In the present embodiment, not displaying the outer region GA2 of the image display region GA means that no image signal is input to each pixel of the outer region GA2 so that each pixel of the outer region GA2 does not emit light, or means that a black displaying image signal is input to each pixel of the outer region GA2 so that each pixel of the outer region GA2 is displayed in black.

The projector 1 according to the present embodiment, which does not display the outer region GA2 of the image display region GA so that no image light exits via the outer region GA2, can suppress ghost components and heat generated by the light that exits via the outer region GA2. Furthermore, not displaying the outer region GA2 allows the reduced image light LT1 having exited via the reduced display region GA1 to have a rectangular outer shape. The outer shape of the image light projected on the screen SCR thus does not greatly change before and after the lens shift operation, so that the user who views the video images on the screen SCR feels less uncomfortable before and after the lens shift operation.

Now, let W1/H1, which is the ratio of the horizontal width W1 to the vertical width H1 of the reduced display region GA1, be the aspect ratio of the reduced display region GA1, and let W/H, which is the ratio of the horizontal width W to the vertical width H of the image display region GA, be the aspect ratio of the image display region GA.

In the projector 1 according to the present embodiment, the controller 7 determines the area of the reduced display region GA1 in such a way that the aspect ratio W1/H1 of the reduced display region GA1 is equal to the aspect ratio W/H of the image display region GA. In the present embodiment, the controller 7 determines the area of the reduced display region GA1 in such a way that the aspect ratio of the reduced display region GA1 is maintained equal to the aspect ratio of the image display region GA, for example, 16:9. The controller 7 also adjusts the definition of the reduced image light LT1 displayed in the reduced display region GA1, to lower definition, for example, from full HD to HD.

In the projector 1 according to the present embodiment, to make the aspect ratio of the reduced display region GA1 equal to the aspect ratio of the image display region GA as described above, reduced image light LT1, which is the image light LT reduced at the same magnification in the horizontal and vertical directions, can be displayed over the entire reduced display region GA1. The projector 1 according to the present embodiment can therefore efficiently display an image with the overall aspect ratio of the reduced display region GA1 maintained. The aspect ratio of the reduced display region GA1 is thus equal to the aspect ratio of the image display region GA, so that the ratio of the horizontal width to the vertical width of the reduced display region GA1 is maintained equal to that of the image display region GA. The change in the aspect ratio, that is, the ratio of the horizontal width to the vertical width of the image light is therefore suppressed before and after the lens shift operation, so that the user can visually recognize video images that cause the user to be less uncomfortable before and after the lens shift operation.

As described above, the projector 1 according to the present embodiment includes the image generator 2, which includes the image display apparatus 22 having the image display region GA, in which the image light LT is displayed, the projection system 3, which projects the image light LT output from the image display apparatus 22 onto the screen SCR, the lens shift mechanism 4, which can shift the position of the projection system 3 in a plane perpendicular to the optical axis 3*a* of the projection system 3, and the controller 7, which controls the image display apparatus 22 when the lens shift mechanism 4 moves the projection system 3 to display the image light LT that is reduced in size in the reduced display region GA1, which is part of the image display region GA.

The projector 1 according to the present embodiment, when the compact projection system 3 having the small image circle IM is shifted by the lens shift mechanism 4, can display the reduced image light LT1, which is the image light LT having been reduced, in the reduced display region GA1, which falls within the image circle IM. Therefore, even a projector including the projection system 3 having the small image circle IM can shift an image to a desired position on the screen SCR and project the shifted image.

The projector 1 according to the present embodiment, which includes the compact projection system 3, can therefore be a compact, lightweight projector that can shift the lenses of the projection system 3.

Since the projector 1 according to the present embodiment employs the single-panel scheme, the image display apparatus 22 has a large panel size. Therefore, in the projector 1 according to the present embodiment, which uses the projection system 3 having the small image circle IM, the image light LT output from the image display apparatus 22 is likely to protrude from the image circle IM when the projection system 3 is shifted only by a small amount.

The projector 1 according to the present embodiment, which controls the image display apparatus 22 during the lens shift operation, can display the reduced image light LT1, which is the image light LT having been reduced, in the reduced display region GA1, which falls within the image circle IM. It can therefore be said that the projector according to the present disclosure is particularly effective in a configuration in which the size of the image display region GA of the liquid crystal panel 221 has a small margin with respect to the size of the image circle IM, as in the projector 1 according to the present embodiment.

The technical scope of the present disclosure is not limited to the embodiments described above, and a variety of changes can be made thereto to the extent that the changes do not depart from the intent of the present disclosure. An aspect of the present disclosure can be achieved by an appropriate combination of the characteristic portions in the embodiment described above.

For example, the projector 1 according to the aforementioned embodiment has been described with reference to the case where the image generator 2 employs the single-panel scheme using one image display apparatus 22, and the image generator may instead employ a three-panel scheme using three image display panels.

Figure 5:
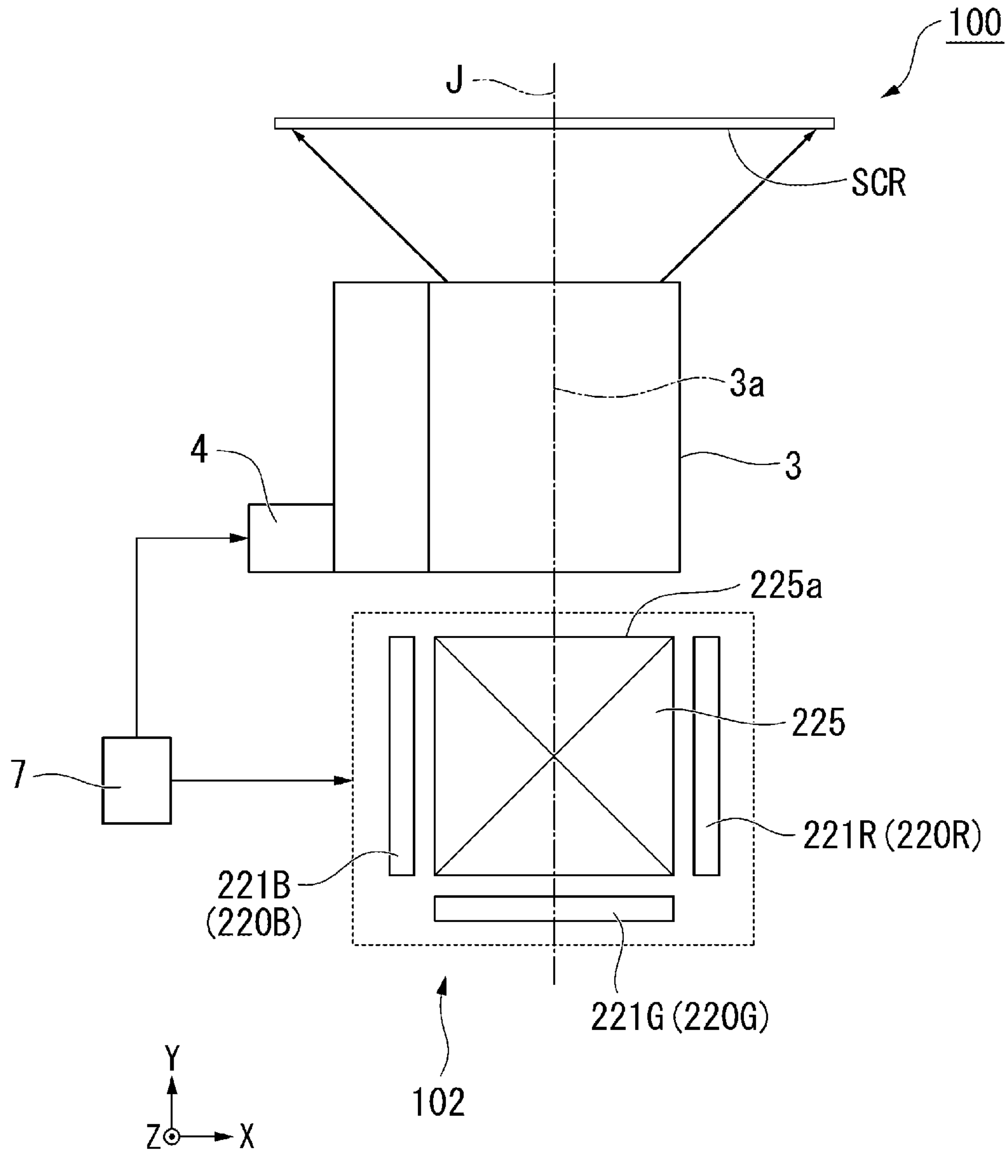
FIG. 5 is a schematic view showing key configurations of a projector employing a three-panel scheme.

FIG. 5 is a schematic view showing key configurations of a projector employing the three-panel scheme.

An image generator 102 of a three-panel projector 100 includes image display apparatuses 220R, 220G, and 220B including liquid crystal panels 221R, 221G, and 221B corresponding to colors RGB, and a cross dichroic prism 225, which combines image light output from the liquid crystal panel 221R, image light output from the liquid crystal panel 221G, and image light output from the liquid crystal panel 221B with one another, as shown in FIG. 5. In FIG. 5, light sources that irradiate the liquid crystal panels 221R, 221G, and 221B with light in the image generator 102 are omitted for simplification of the illustration.

The projection system 3 is disposed to face a light exiting surface 225*a*, via which the combined image light from the cross dichroic prism 225 exits, via the lens shift mechanism 4. The controller 7 controls the liquid crystal panels 221R, 221G, and 221B and the lens shift mechanism 4 based on information on the positions of the image display regions of the liquid crystal panels 221R, 221G, and 221B and the position of the image circle IM of the projection system 3.

The thus configured projector 100, even when it employs the three-plate scheme, allows the shift of the projection lens with the size of the projector 100 reduced.

The aforementioned embodiment has been described with reference to the case where the projection system 3 is shifted upward in the upward-downward direction Z during the lens shift operation, and the present disclosure is also applicable to a case where the projection lens is shifted downward in the upward-downward direction or rightward or leftward in the rightward-leftward direction. Furthermore, since the lens shift mechanism 4 in the present embodiment can shift the projection system 3 in any direction in a plane extending along the plane XZ perpendicular to the optical axis 3*a* of the projection system 3, the present disclosure is also applicable to a case where the projection lens is shifted in any direction in a plane extending along the plane XZ, for example, obliquely upward.

Moreover, the aforementioned embodiment has been described with reference to the case where the controller 7 controls the operation of driving the image display apparatus 22 based on the pulse signal to the stepper motor 43*a* of the lens shift mechanism 4, and the present disclosure is also applicable to a case where the controller controls the operation of driving an image display panel based on the amount of dial rotation manually performed by the user.

In addition, the specific descriptions of the shapes, the numbers, the arrangements, the materials, and other factors of the components of the projector are not limited to those in the embodiment described above and can be changed as appropriate. Furthermore, the aforementioned embodiment has been described with reference to the case where a liquid crystal panel is used as the image display apparatus, and a self-luminous panela, such as a digital micromirror device and an organic EL panel, may instead be used.

The present disclosure will be summarized below as additional remarks.

Additional Remark 1

A projector including an image generator that includes an image display apparatus having an image display region in which image light is displayed, a projection system that projects the image light output from the image display apparatus onto a projection receiving surface, a lens shift mechanism configured to shift the position of the projection system in a plane perpendicular to the optical axis of the projection system, and a controller that controls the image display apparatus when the lens shift mechanism moves the projection system to display the image light that is reduced in size in a reduced display region that is part of the image display region.

According to the thus configured projector, when the projection system, which is compact and has a small image circle, is shifted by the lens shift mechanism, the reduced image light, which is the image light having been reduced in size, can be displayed in the reduced display region that falls within the image circle. Therefore, even the projector including the projection system having a small image circle can shift an image to a desired position on the projection receiving surface and project the shifted image.

The configuration described above, which can incorporate the compact projection system, allows a compact, lightweight projector that allows lens shift to be achieved.

Additional Remark 2

The projector described in the additional remark 1, in which the controller detects the amount by which the lens shift mechanism shifts the projection system, and determines the area of the reduced display region based on the detected amount of shift.

According to the configuration described above, since the area of the reduced display region is determined based on the amount of shift of the projection system, a situation in which the area of the reduced display region becomes excessively small can be avoided. That is, the area of the reduced display region can be set at an appropriate size.

Additional Remark 3

The projector described in the additional remark 2, in which the lens shift mechanism includes a stepper motor that moves the projection system, and the controller detects the amount of the shift of the projection system based on a pulse signal supplied to the stepper motor.

According to the configuration described above, the amount of the shift of the projection system can be detected with high accuracy based on the pulse signal.

Additional Remark 4

The projector described in any one of the additional remarks 1 to 3, in which the controller controls the image display apparatus not to display an outside region of the reduced display region in the image display region. According to the configuration described above, not displaying the outer region of the reduced display region allows the reduced image light that exits via the reduced display region to have a rectangular outer shape. Therefore, the outer shape of the image light projected onto the projection surface does not greatly change before and after the lens shift operation, so that the user who views the image projected on the projection surface feels less uncomfortable before and after the lens shift operation.

Additional Remark 5

The projector described in any one of the additional remarks 1 to 4, in which the controller determines the area of the reduced display region in such a way that the aspect ratio of the reduced display region is equal to the aspect ratio of the image display region.

According to the configuration described above, the aspect ratio of the reduced display region is equal to the aspect ratio of the image display region, so that the ratio of the horizontal width to the vertical width of the reduced display region is maintained equal to that of the image display region. The change in the aspect ratio, that is, the ratio of the horizontal width to the vertical width of the image light is therefore suppressed before and after the lens shift operation, so that the user can visually recognize video images that cause the user to be less uncomfortable before and after the lens shift operation.

Additional Remark 6

The projector described in any one of the additional remarks 1 to 5, in which the image display apparatus includes a liquid crystal panel, and the image generator includes a light source that irradiates the liquid crystal panel with light.

According to the configuration described above, an image generator that generates desired image light by modulating the light output from the light source with the liquid crystal panel can be achieved.

Additional Remark 7

The projector described in the additional remark 6, in which the liquid crystal panel includes a color filter, and the light output by the light source is white light.

According to the configuration described above, which includes the image generator that is a combination of the liquid crystal panel having a color filter and the white light, full-color image light can be generated.

What is claimed is:

1. A projector comprising:

an image generator that includes an image display apparatus having an image display region in which image light is displayed;

a projection system that projects the image light output from the image display apparatus onto a projection receiving surface;

a lens shift mechanism configured to shift a position of the projection system in a plane perpendicular to an optical axis of the projection system; and a controller that controls the image display apparatus when the lens shift mechanism moves the projection system to display the image light that is reduced in size in a reduced display region that is part of the image display region, wherein the controller determines an area of the reduced display region in such a way that an aspect ratio of the reduced display region is equal to an aspect ratio of the image display region.

2. The projector according to claim 1, wherein the lens shift mechanism includes a stepper motor that moves the projection system, and the controller detects the amount of the shift of the projection system based on a pulse signal supplied to the stepper motor.

3. The projector according to claim 1, wherein the controller controls the image display apparatus not to display an outside region of the reduced display region in the image display region.

4. The projector according to claim 1, wherein the image display apparatus includes a liquid crystal panel, and the image generator includes a light source that irradiates the liquid crystal panel with light.

5. The projector according to claim 4, wherein the liquid crystal panel includes a color filter, and the light output by the light source is white light.

6. The projector according to claim 1, wherein the controller detects an amount by which the lens shift mechanism shifts the projection system and determines an area of the reduced display region based on the detected amount of shift.

* * * * *